3,200,000
DISPERSANTS FOR ORGANIC PIGMENTS IN AN ORGANIC MEDIUM
Charles R. Williams, Longmeadow, Mass., assignor to Monsanto Company, St. Louis, Mo., a corporation of Delaware
No Drawing. Filed June 4, 1964, Ser. No. 372,699
5 Claims. (Cl. 106—309)

This invention relates to dispersing organic pigments in a liquid organic medium.

This application is a continuation-in-part of the copending application Serial No. 227,695, filed October 2, 1962.

The dispersing of organic pigments in a liquid organic medium has always presented the problem of obtaining an effective and a stable dispersion of the organic pigment. This problem exists because of the complex structure of organic pigments and because of their generally high molecular weights. A satisfactory dispersion of these pigments is necessary in order to prevent settling and caking of the pigment, particularly while the dispersion is being stored or shipped. Further, effective and stable dispersions of organic pigments in an organic medium are of particular importance when coating compositions are employed in the recently popular household pressure-type spray containers. Settling or caking of such a pigment would be extremely detrimental to the proper operation of these spray containers.

Therefore, the obtaining of effective and stable dispersions of organic pigments in an organic medium by employing an organic dispersing agent therein is of extreme importance to the industry.

Thus, it is an object of this invention to provide a process for preparing dispersions of organic pigments in a liquid organic medium.

Briefly, according to this invention, the foregoing and other objects are attained by incorporating with an organic pigment in a liquid organic medium a tertiary alkyl ammonium salt of an alkyl ester of an olefin-maleic anhydride copolymer, which is an effective dispersing agent for the organic pigment.

The following examples are set forth to illustrate more clearly the principle and practice of this invention and are not intended to limit the scope thereof. Unless otherwise indicated, all parts are parts by weight.

*Example I*

To an ethylene-maleic anhydride copolymer having a molecular weight of about 1500 as determined by the specific viscosity of a 1% solution of the ethylene-maleic anhydride copolymer in dimethyl formamide, add a quantity of butyl alcohol in excess of a stoichiometrically equivalent portion thereof and form a slurry. Heat the slurry to the boiling point of the butyl alcohol and reflux until a clear solution is formed. Cool the solution to room temperature. Recover by precipitation in hexane, which precipitate is the half-butyl ester of the ethylene-maleic anhydride copolymer. Dissolve 6.1 parts thereof in 90 parts of xylene, which contains therein 3.9 parts of tri(n-propyl) amine, so as to form a 10% solids solution of tri(n-propyl) ammonium salt of the half-butyl ester of the ethylene-maleic anhydride copolymer.

Two dispersion samples are prepared. One sample contains 25 parts of the above solution and 10 parts of the organic pigment phthalocyanine blue (Monastral blue). The other sample contains 25 parts of the above solution and 10 parts of the organic pigment toluidine red (C.P. Toner A-2990).

Each sample is a satisfactory dispersion of the organic pigment in the organic medium employed therein.

The novelty of this invention is found in the use of certain specified salts of alkyl esters of an olefin maleic anhydride copolymer as a dispersing agent in a process for preparing dispersions of organic pigments in an organic medium. The quantity necessary to produce a stable and an effective dispersion is 0.1–7.0 weight percent of the dispersing agent based on the weight of the organic pigment employed.

More specifically, this invention is directed to a process for preparing a dispersion of an organic pigment in a liquid organic medium by incorporating therein a tertiary alkyl ammonium salt of an alkyl ester of an olefin maleic anhydride copolymer, which salt of the alkyl ester of the olefin-maleic anhydride copolymer has in its structure recurring groups of the formulae:

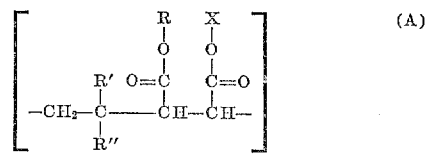

and

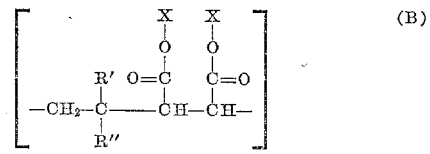

wherein the groups of Formula A constitute 50–100% and preferably 80–100% of the total of groups (A) and (B). In the above formulae, R is an alkyl radical having 3–18 carbon atoms, R' is selected from the group consisting of hydrogen, methyl and ethyl, and R'' is selected from the group consisting of hydrogen and methyl. However, when R' of the above formulae is ethyl, then R'' is hydrogen. As represented in the above formulae, X is a positive charged ion formed from tertiary alkyl amines. It will be recognized that when certain reaction conditions are used in forming the alkyl ester of an olefin-maleic anhydride copolymer, no groups of Formula B would be present in the final product. In the practice of this invention, the preferred tertiary alkyl ammonium salt of an alkyl ester of an olefin-maleic anhydride copolymer is the tri(n-propyl) ammonium salt of the butyl ester of an ethylene-maleic anhydride copolymer.

In the practice of this invention, the molecular weight of the tertiary alkyl ammonium salt of the alkyl ester of an olefin-maleic anhydride copolymer is significant as to its use as a dispersant for organic pigments in a liquid organic medium. The copolymer employed in this invention to prepare the salt thereof should have a weight average molecular weight of up to about 10,000 and preferably 800–4000 and more particularly 1000–2500. In the preferred embodiment of this invention wherein the salt of the copolymer is the tri(n-propyl) ammonium salt of the butyl ester of an ethylene-maleic anhydride copolymer, the recurring groups of Formulae A and B total 3–20 for the preferred weight average molecular weight of about 800–4000 for the copolymer portion of the groups of Formulae A and B. Depending upon the structure of Formulae A and B and in particular where the salt of the copolymer consists of 100% of Formula A, the number of recurring groups thereof can total up to about 50 in order to achieve a weight average molecular weight of 10,000 for the copolymer portion of the group of Formula A. If the weight average molecular weight of the olefin-maleic anhydride copolymer portion of the groups as set forth in Formulae A and B is in excess of 10,000, the dispersing effect of the salt of the copolymer is no longer practicable and probably serves little use in dispersing organic pigments in a liquid organic medium. Optimum dispersing action is generally achieved with the copolymer portion having a weight average molecular weight of 1000–2500.

The tertiary alkyl ammonium salt of an alkyl ester of an olefin-maleic anhydride copolymer as employed herein is an excellent dispersing agent for organic pigments in organic media. They are soluble in such organic media as mineral spirits, methyl ethyl ketone, toluol, xylol, etc., and mixtures thereof. The tertiary alkyl amines suitable for use in preparing the corresponding tertiary alkyl ammonium salts of the alkyl esters of the olefin-maleic anhydride copolymers have in each alkyl moiety 2–6 carbon atoms and preferably 3–5 carbon atoms. Typical amines which may be employed in the practice of this embodiment are tri-ethylamine, triisopropylamine, tri-(n-propyl) amine, tri-butylamine and tri-isopropylamine, and mixtures thereof with the preferred tertiary alkyl amine being the tri(n-propyl) amine.

The alkyl esters of an olefin-maleic anhydride copolymer employed in the practice of this invention may be prepared by slurrying an olefin-maleic anhydride copolymer in a quantity of alcohol in excess of a stoichiometrically equivalent portion thereof. The mixture is maintained at a temperature ranging from about 50° C. to about 220° C. for a period from about 2 minutes to about 90 minutes. However, it will be recognized that if a partial alkyl ester of an olefin-maleic anhydride copolymer is prepared, less than a stoichiometrically equivalent portion of an alcohol would be employed. To make up the balance of liquid necessary to form a slurry, an inert organic solvent should be used. As used herein, "inert organic solvent" means any organic solvent that is not reactive with a carboxylic anhydride or an alcohol and includes solvents selected from the class consisting of ketones, aromatics and esters. The product obtained therefrom is the acid form of the alkyl ester of an olefin-maleic anhydride copolymer. When this product is converted to the tertiary alkyl ammonium salt, it is readily soluble in the organic media previously specified.

The olefin-maleic anhydride copolymer portion of an alkyl ester of an olefin-maleic anhydride copolymer as employed herein may be either an ethylene-maleic anhydride, a propylene-maleic anhydride, a butylene-maleic anhydride or an isobutylene-maleic anhydride copolymer. The basic structure of these copolymers have recurring groups of the formula.

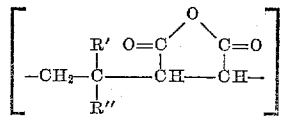

The alkyl portion of the alkyl ester of an olefin-maleic anhydride copolymer is derived from alkyl alcohols having an aliphatic moiety of 3–18 carbon atoms. Typical examples of the alcohols that may be employed are propyl alcohol, butyl alcohol, octyl alcohol, and octadecyl alcohol.

The preparation of the liquid organic dispersion of an organic pigment is carried out first by completely dissolving under agitation the dispersing agent in a portion of the liquid organic medium to be employed therein. The organic pigment to be employed is then added under agitation, which may be accomplished by the use of a mechanical stirrer, ball-mill mixer, three-roll mixer or any of the other conventional mixers commonly employed in preparing pigment dispersions. The pigment solids can be adjusted to the desired concentration by addition of the remainder of the liquid organic medium.

The advantages of this invention are found in the ability of the tertiary alkyl ammonium salt of the alkyl ester of an olefin-maleic anhydride copolymer to disperse organic pigments so as to provide unusually stable dispersions of the organic pigments. Typical examples of a few of the organic pigments which are readily dispersed are the phthalocyanine blues, phthalocyanine greens, toluidine reds, Hansa yellow, B.O.N. reds, litho reds and para reds. A few specific applications of the dispersions of this invention include textile printing paste systems such as oil-in-water, water-in-oil or straight oil, printing inks predispersed organic pigment systems, dispersions of organic pigments in surface coating compositions, dispersions of organic pigments in organic aerosol formulations such as acrylate resin in a solvent solution, dispersions of insecticides, fungicides, and dispersions of rubber chemicals for the purpose of satisfactory compounding.

It will thus be seen that the objects set forth above among those made apparent from the preceding description are efficiently obtained, and since certain changes may be made in carrying out the above process and in the compositions set forth without departing from the scope of the invention, it is intended that all matter contained in the above description be interpreted as illustrative and not in a limiting sense.

What is claimed is:

1. In a process for preparing dispersions of insoluble organic pigments in a liquid organic medium; the improvement which comprises incorporating in the liquid organic medium a tertiary alkyl ammonium salt of an alkyl ester of an olefin-maleic anhydride copolymer in the amount of 0.1–7.0 weight percent based on the weight of the organic pigment dispersed therein; said tertiary alkyl ammonium salt of an alkyl ester of an olefin-maleic anhydride copolymer having a weight average molecular weight of up to about 10,000 and having in its structure recurring groups of the formulae:

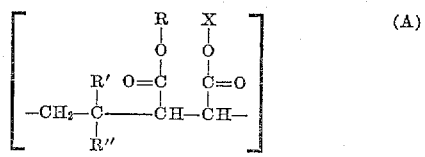

and

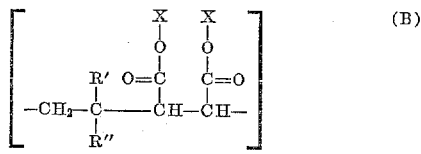

with the groups of Formula A constituting 50–100% of the total of groups (A) and (B); wherein R is an alkyl radical having 3–18 carbon atoms; R' is selected from the group consisting of hydrogen, methyl, and ethyl; R" is selected from the group consisting of hydrogen and methyl, providing that when R' is ethyl, R" is hydrogen; and X is a tertiary alkyl ammonium ion in which each alkyl moiety contains 2–6 carbon atoms.

2. A process as described in claim 1 wherein the tertiary alkyl ammonium salt of an alkyl ester of an olefin-maleic anhydride copolymer is a tertiary alkyl ammonium salt of an alkyl ester of an ethylene-maleic anhydride copolymer.

3. A process as described in claim 1 wherein the tertiary alkyl ammonium salt of an alkyl ester of an olefin-maleic anhydride copolymer is a tri(n-propyl) ammonium salt.

4. A process as described in claim 1 wherein the tertiary alkyl ammonium salt of an alkyl ester of an olefin-maleic anhydride copolymer is the tri(n-propyl) ammonium salt of a butyl ester of an ethylene-maleic anhydride copolymer.

5. A process as described in claim 1 wherein the liquid organic medium is xylene.

References Cited by the Examiner
UNITED STATES PATENTS

| | | | |
|---|---|---|---|
| 2,977,334 | 3/61 | Zopf et al. | 260—78.5 |
| 3,037,875 | 6/62 | Geiser | 106—308 |
| 3,088,837 | 5/63 | Prescott et al. | 106—262 |

TOBIAS E. LEVOW, *Primary Examiner.*